US006540408B1

(12) United States Patent
Jinnai

(10) Patent No.: US 6,540,408 B1
(45) Date of Patent: Apr. 1, 2003

(54) WAVEGUIDE CONNECTING METHOD AND STRUCTURE

(75) Inventor: Taketoshi Jinnai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/723,234

(22) Filed: Nov. 28, 2000

(30) Foreign Application Priority Data

Nov. 29, 1999 (JP) ........................................ 11-337758

(51) Int. Cl.[7] ............................................ G02B 6/38
(52) U.S. Cl. .................................................. 385/55
(58) Field of Search ............................ 385/55, 58, 60, 385/70, 71, 72, 95, 97, 98; 333/254

(56) References Cited

U.S. PATENT DOCUMENTS

| | | | | |
|---|---|---|---|---|
| 3,374,450 A | | 3/1968 | Stewart | 333/254 |
| 3,784,939 A | | 1/1974 | Maeda et al. | 333/98 R |
| 3,786,377 A | | 1/1974 | Spinner | 333/98 R |
| 5,432,879 A | * | 7/1995 | Lee | 385/60 |
| 5,563,971 A | * | 10/1996 | Abendschein | 385/55 |

FOREIGN PATENT DOCUMENTS

| | | |
|---|---|---|
| DE | 820455 | 11/1951 |
| GB | 654135 | 6/1951 |
| JP | 58-47301 | 3/1983 |
| JP | 60-105197 | 6/1985 |
| JP | 1-95801 | 6/1989 |
| JP | 3-28801 | 3/1991 |
| JP | 4-75403 | 7/1992 |
| JP | 8-170528 | 7/1996 |
| JP | KOKAI 9-312501 | 12/1997 |
| JP | 9-312501 | 12/1997 |
| JP | 10-318465 | 12/1998 |

OTHER PUBLICATIONS

European Search Report dated Mar. 22, 2002.

* cited by examiner

*Primary Examiner*—Javaid Nasri
(74) *Attorney, Agent, or Firm*—McGinn & Gibb, PLLC

(57) ABSTRACT

According to a waveguide connecting method, a shim is fabricated to have a cylindrical portion and flange. The cylindrical portion has an outer diameter substantially equal to an inner diameter of a first waveguide which is to be connected to a second waveguide. The flange projects from one end of the cylindrical portion outwardly. The other end of the cylindrical portion of the shim is inserted into the first waveguide. The second waveguide is urged against the first waveguide, with an end face of the second waveguide being in contact with the flange of the shim, until the end face of the second waveguide abuts against an end face of the first waveguide. A waveguide connecting structure is also disclosed.

14 Claims, 6 Drawing Sheets

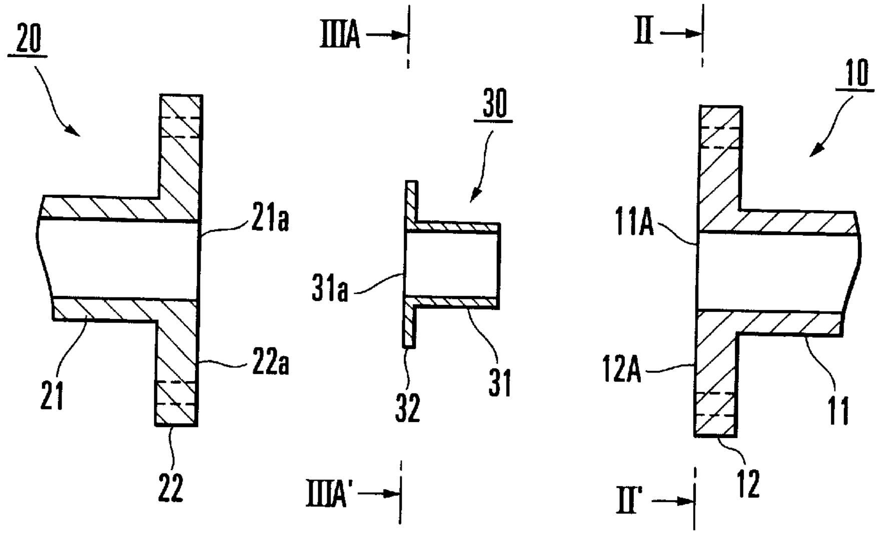
FIG. 1A
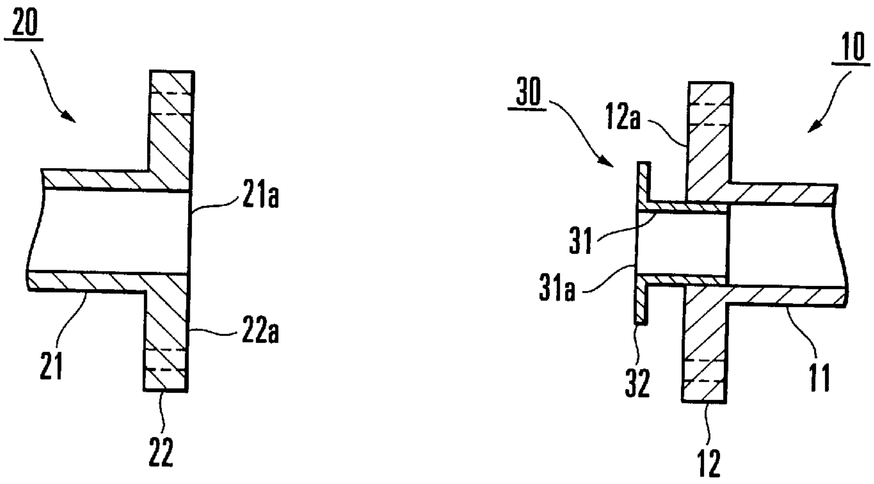
FIG. 1B
FIG. 1C
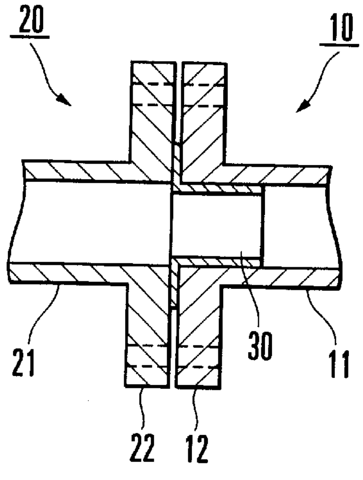

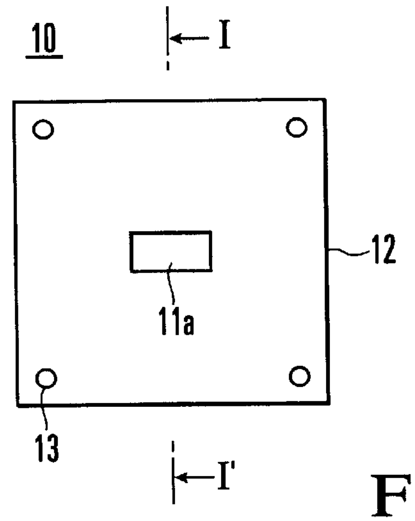
FIG. 2
FIG. 3A
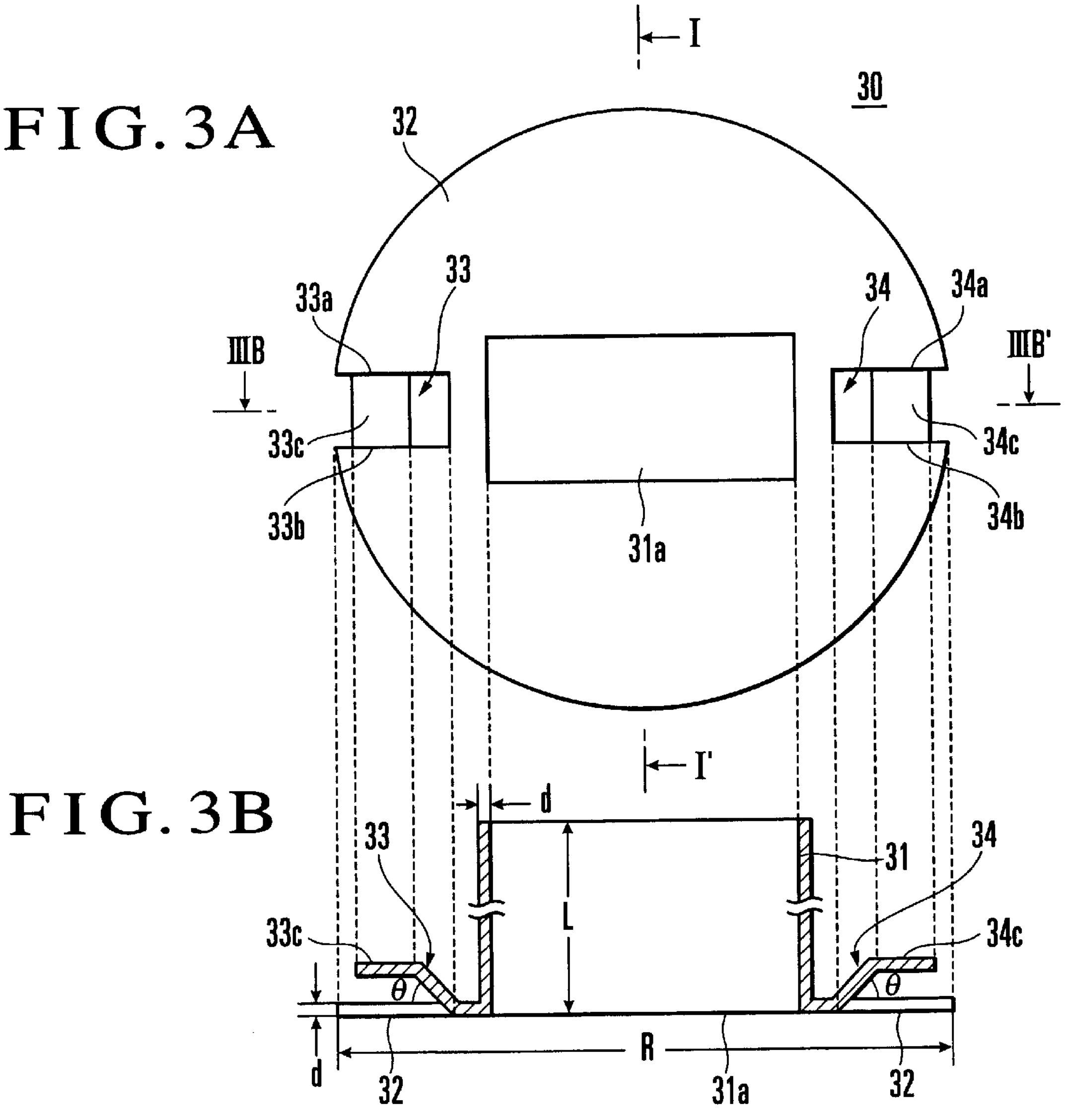
FIG. 3B

WAVEGUIDE CONNECTING METHOD AND STRUCTURE

BACKGROUND OF THE INVENTION

The present invention relates to a waveguide connecting method and structure for connecting waveguides to each other and, more particularly, to a waveguide connecting method and structure for connecting waveguides to each other by using a shim which closes a gap formed between the end faces of the waveguides.

When connecting waveguides to each other, if a gap is formed between the end faces of the waveguides or the flange surfaces of flanges formed on the ends of the waveguides, a reflection wave is generated at the connecting portion, and a loss (reflection loss) due to the reflection wave increases. In order to improve the reflection characteristics by decreasing the reflection loss caused at the waveguide connecting portion, a choke flange is generally used.

If the flange surfaces outside a choke groove cannot be brought into tight contact with each other, a sufficient effect cannot be obtained. A waveguide connecting structure for obtaining better reflection characteristics is proposed in Japanese Patent Laid-Open No. 9-312501 (reference 1).

FIG. 8 shows the sectional structure of the connecting portion of two waveguides 110 and 120 disclosed in reference 1. Referring to FIG. 8, a ring-like groove 116 is formed in the surface of a flange 112 of the waveguide 110 to surround an opening 111*a*. A thin metal plate 117 with spring properties and a radio wave absorber 118 are disposed in the groove 116. The metal plate 117 is bent to have an uneven section, and some bent portions 117*a* and 117*b* project from its flange surface 112*a*.

When the waveguide 120 is to be connected to the waveguide 110, the bent portions 117*a* and 117*b* are forced backward as they are pushed by a flange surface 122*a* of the waveguide 120. Hence, when connecting the waveguides 110 and 120, the bent portions 117*a* and 117*b* of the metal plate 117 come into tight contact with the flange surface 122*a* of the waveguide 120. At this time, during connection, even if a gap is formed due to damage and unevenness of the flange surfaces 112*a* and 122*a* of the waveguides 110 and 120, it is closed midway by the bent portions 117*a* and 117*b*.

In the conventional waveguide connecting structure described above, the position where the gap is closed by the metal plate 117 of the waveguide 110 is away from the opening 111*a* of the waveguide 110 and an opening 121*a* of the waveguide 120, that is, from the interiors of the waveguides. Since the discontinuity of the connecting portion itself of the waveguides 110 and 120 is not solved, a sufficient effect cannot be obtained in improving the reflection characteristics.

SUMMARY OF THE INVENTION

It is an object of the present invention to provide a waveguide connecting method and structure that can provide good reflection characteristics when waveguides are connected to each other.

In order to achieve the above object, according to the present invention, there is provided a waveguide connecting method comprising the steps of fabricating a shim with a cylindrical portion and a flange which projects from one end of the cylindrical portion outwardly, the cylindrical portion having an outer diameter substantially equal to an inner diameter of a first waveguide which is to be connected to a second waveguide, inserting the other end of the cylindrical portion of the shim into the first waveguide, and urging the second waveguide against the first waveguide, with an end face of the second waveguide being in contact with the flange of the shim, until the end face of the second waveguide abuts against an end face of the first waveguide.

BRIEF DESCRIPTION OF THE DRAWINGS

FIGS. 1A to 1C are schematic sectional views taken along the line I–I' of FIG. 2, showing the steps in a waveguide connecting method according to the first embodiment of the present invention;

FIG. 2 is a front view of a waveguide seen from the direction of the line II–II' of FIG. 1A;

FIG. 3A is a front view of the shim shown in FIG. 1A, and FIG. 3B is a sectional view taken along the line IIIB–IIIB' of FIG. 3A;

DESCRIPTION OF THE PREFERRED EMBODIMENTS

Figure 4A:
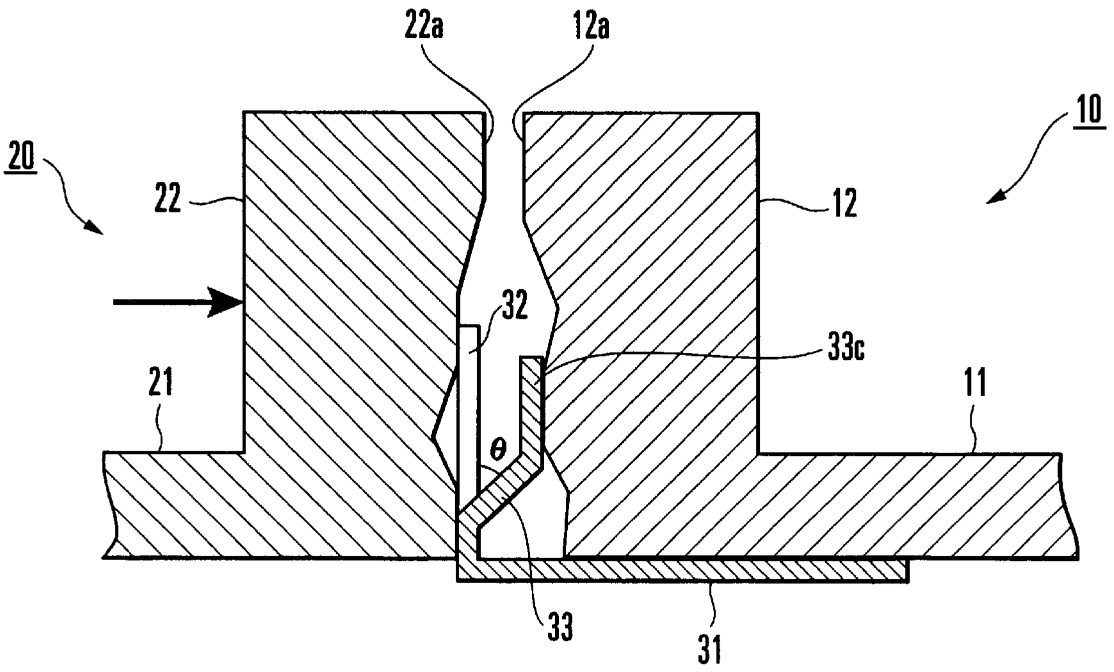
FIGS. 4A and 4B are enlarged sectional views of the connecting portion for explaining the operation of coupling the waveguides to each other.

The present invention will be described in detail with reference to the accompanying drawings.

FIGS. 1A to 1C show a waveguide connecting method according to an embodiment of the present invention. In a waveguide connecting structure of this embodiment, a waveguide (first waveguide) 10 and a waveguide (second waveguide) 20 are connected to each other through a slide type shim 30.

As shown in FIG. 1A, the waveguide 10 is comprised of a cylindrical waveguide portion 11 which forms the main body of the waveguide 10, and a substantially square flange 12 formed at the end of the waveguide portion 11 outwardly. The waveguide portion 11 may be a square or circular waveguide, and is a square waveguide in this case. As shown in FIG. 2, the flange 12 has a rectangular opening 11*a* where the waveguide portion 11 opens, and four coupling holes 13 formed at the four corners of the flange 12 to insert bolts. That surface of the flange 12 which is continuous to the end face of the waveguide 10 is called a flange surface 12*a*.

The waveguide 20 has a structure similar to that of the waveguide 10, and is comprised of a square cylindrical waveguide portion 21 and a substantially square flange 22 formed at the end of the waveguide portion 21. The shim 30 is made of a metal such as stainless steel, and is comprised of a cylindrical portion 31 with an outer diameter corresponding to the inner diameter of the waveguide portion 11 of the waveguide 10, and a flange 32 formed at the end of the cylindrical portion 31 outwardly.

Practical examples of the sizes of the respective portions of the shim 30 will be explain ed with reference to FIG. 3B.

A length L of the cylindrical portion 31, a diameter R of the flange 32, and thicknesses d of the cylindrical portion 31 and flange 32 are 7 mm, 15.8 mm, and 0.2 mm, respectively. Note that the length L of the cylindrical portion 31 and the diameter R of the flange 32 are examples in a 23-GHz band, and change depending on the frequency band. Even so, the diameter of the flange 32 of the shim 30 is much smaller than those of the flanges 12 and 22 of the waveguides 10 and 20.

As shown in FIGS. 3A and 3B, the flange 32 of the shim 30 has an opening 31*a* of the cylindrical portion 31, and two pawl-like portions 33 and 34 with spring properties and formed on the two sides of the opening 31*a* to sandwich it in the longitudinal direction. The shape of the opening 31*a* is square to match the sectional shape of the waveguide portion 11 in a direction perpendicular to the direction of tube axis.

The pawl-like portion 33 is formed by bending back a portion sandwiched by a pair of incisions 33*a* and 33*b*, formed in the periphery of the flange 32, toward the other end of the cylindrical portion 31 with an angle θ. Similarly, the pawl-like portion 34 is formed by bending back a portion sandwiched by a pair of incisions 34*a* and 34*b*, formed in the periphery of the flange 32, toward the other end of the cylindrical portion 31 by the angle θ. Distal ends 33*c* and 34*c* of the pawl-like portions 33 and 34 are further bent parallel to the flange 32.

As described above, the two pawl-like portions 33 and 34 are formed in the periphery of the flange 32 at positions point-symmetrical with respect to the center (central axis of the cylindrical portion 31) of the flange 32. Alternatively, three or more pawl-like portions may be formed at necessary positions, e.g., at a predetermined interval in the periphery of the flange 32, as will be described later, so that they can urge the flange 32 of the shim 30 against the flange surface 22*a* of the waveguide 20 with uniform forces.

The shim 30 with the above structure is prepared, and that end of the cylindrical portion 31 where the flange 32 is not formed is inserted in the waveguide 10 through the opening 11*a* of the waveguide 11, as shown in FIG. 1B. Since the outer diameter of the cylindrical portion 31 is substantially equal to the inner diameter of the waveguide portion 11, the cylindrical portion 31 is slid in the waveguide portion 11. In this case, the cylindrical portion 31 may be slid in the waveguide portion 11 so that it is inserted until the rear surfaces of the pawl-like portions 33 and 34 of the shim 30 come into contact with the flange surface 12*a* of the waveguide 10.

Subsequently, the waveguides 10 and 20 are aligned with each other, so a flange surface 22*a* of the flange 22 of the waveguide 20 comes into contact with the flange 32 of the shim 30. The waveguide 20 is urged against the waveguide 10 in which the shim 30 has been inserted, to further insert the cylindrical portion 31 of the shim 30 into the waveguide portion 11 of the waveguide 10, as shown in FIG. 1C. Then, bolts are inserted in the coupling holes 13 of the waveguides 10 and 20, and nuts are screwed on the bolts, thereby coupling the waveguides 10 and 20 to each other.

Figure 4B:
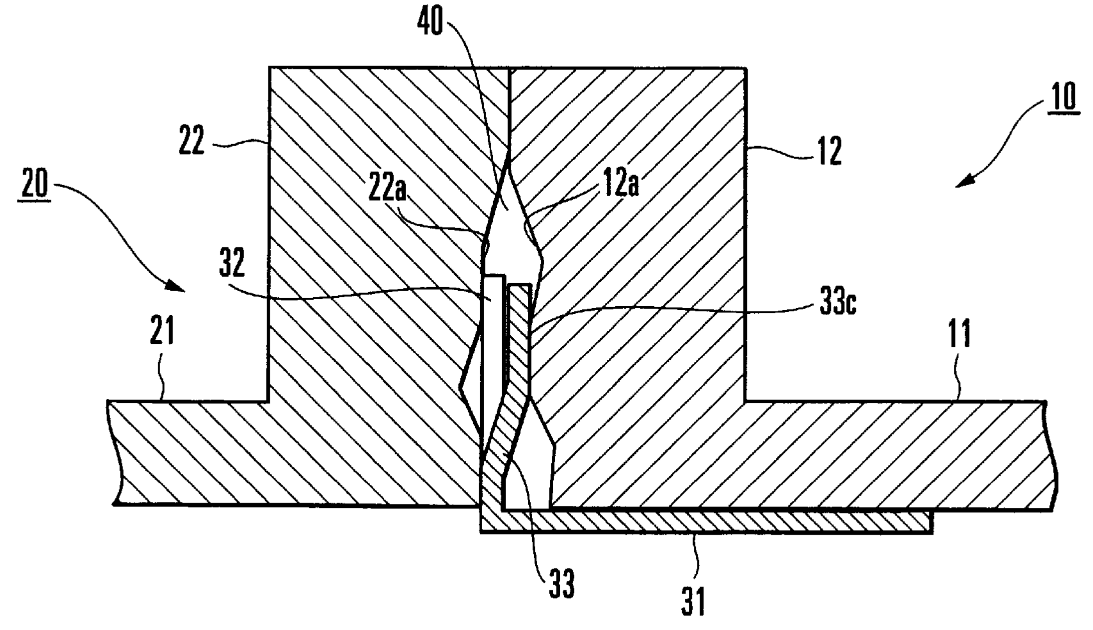

The action of the shim 30 in the steps from FIG. 1B to FIG. 1C will be described with reference to FIGS. 4A and 4B. In FIGS. 4A and 4B, the flange 32 of the shim 30 is drawn thicker than it actually is, and accordingly the unevennesses of the flange surfaces 12*a* and 22*a* of the waveguides 10 and 20 are drawn larger than they actually are.

First, when the waveguide 20 is urged against the waveguide 10, the rear surface of the distal end 33*c* of the pawl-like portion 33 comes into contact with the flange surface 12*a* of the waveguide 10, and simultaneously the flange surface 22*a* of the waveguide 20 comes into contact with the flange 32 of the shim 30, as shown in FIG. 4A. In this state, when the waveguide 20 is further urged against the waveguide 10, the flange 32 of the shim 30 is pushed by the flange surface 22*a* of the waveguide 20, so that the cylindrical portion 31 of the shim 30 slides in the waveguide portion 11 of the waveguide 10.

In this case, the flange surface 12*a* of the waveguide 10 urges the pawl-like portion 33 of the shim 30 toward the flange 22 of the waveguide 20, and accordingly the angle θ of the pawl-like portion 33 with respect to the flange 32 decreases. Since the pawl-like portion 33 has spring properties, the flange 32 of the shim 30 is urged against the flange surface 22*a* of the waveguide 20. Thus, as shown in FIG. 4B, the cylindrical portion 31 of the shim 30 comes into tight contact with the inner wall of the waveguide portion 11 of the waveguide 10, and simultaneously the flange 32 of the shim 30 comes into tight contact with the flange surface 22*a* of the waveguide 20.

In this case, at the connecting portion of the waveguides 10 and 20, the cylindrical portion 31 of the shim 30 partly constitutes the waveguides 10 and 20, and a gap 40 formed by the unevennesses of the flange surfaces 12*a* and 22*a* is separated away from the interiors of the waveguides 10 and 20 by the cylindrical portion 31. The gap 40 is closed by portions around the opening 11*a* of the waveguide 10 and around an opening 21*a* of the waveguide 20, thus improving the discontinuity at the waveguide connecting portion.

As a result, radio waves such as microwaves input from the waveguide 10 are transmitted to the waveguide 20 without generating reflection waves in the gap 40 present between the flange surfaces 12*a* and 22*a* and without leaking outside through the gap 40. Since the cylindrical portion 31 of the shim 30 has the thickness d, reflection waves may be generated at the end face of the cylindrical portion 31. However, as the thickness d of the cylindrical portion 31 is as very small as 0.2 mm, the reflection waves generated at the end face of the cylindrical portion 31 are negligibly small as compared to the reflection waves generated in the gap 40 between the flange surfaces 12*a* and 22*a.*

According to this embodiment, with the presence of the shim 30 between the waveguides 10 and 20, a loss caused by reflection waves and the like can be decreased, so that the transmission characteristics such as reflection characteristics can be improved.

Figure 8:
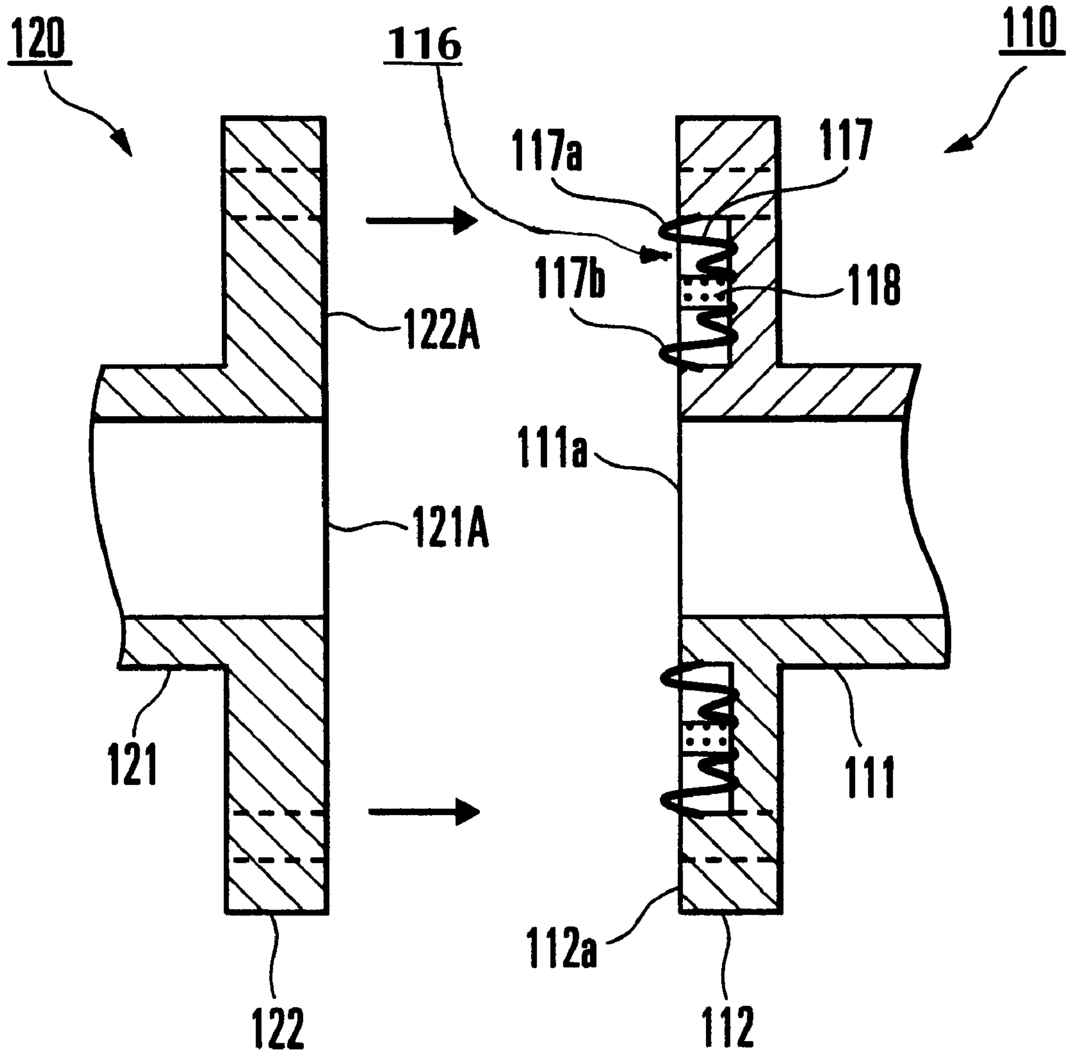
FIG. 8 PRIOR ART
FIG. 8 is a sectional view of a conventional waveguide connecting structure.

According to the prior art shown in FIG. 8, since the groove 116 where the metal plate 117 and the like are to be arranged is formed in the surface of the flange 112 of the waveguide 110, a groove where a packing is to be fitted cannot be formed in the flange 112. In contrast to this, according to the present invention, since the groove 116 is not necessary, grooves where a packing is to be fitted can be formed in the flanges 12 and 22 of the waveguides 10 and 20, respectively.

Figure 5A:
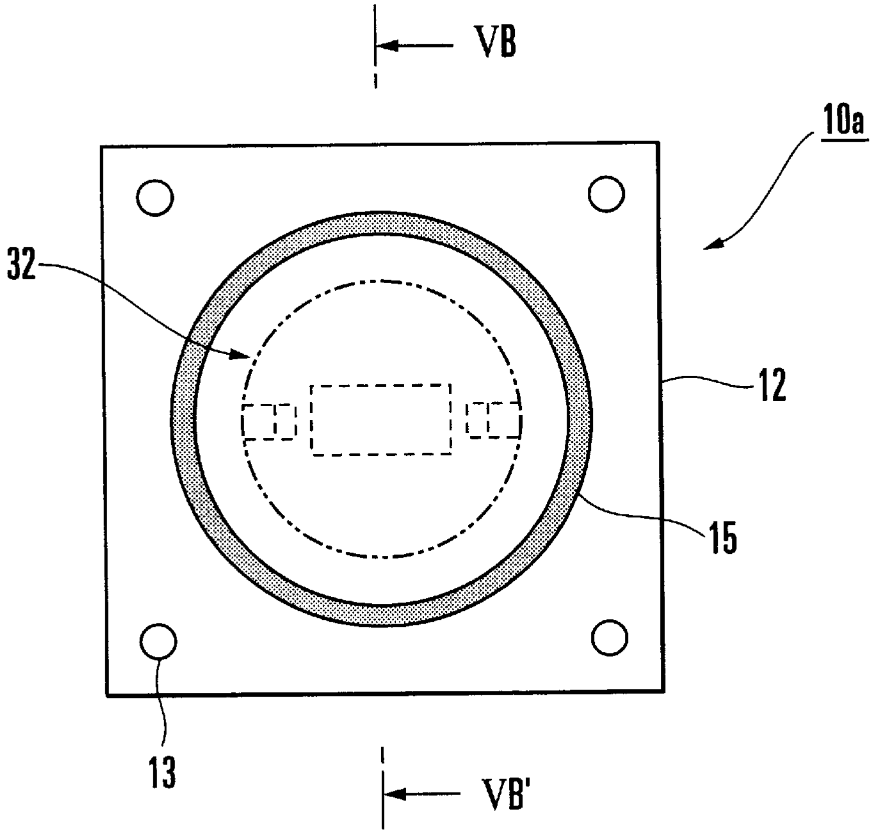
FIG. 5A is a front view of a waveguide in a case wherein a packing is fitted in a flange.
Figure 5B:
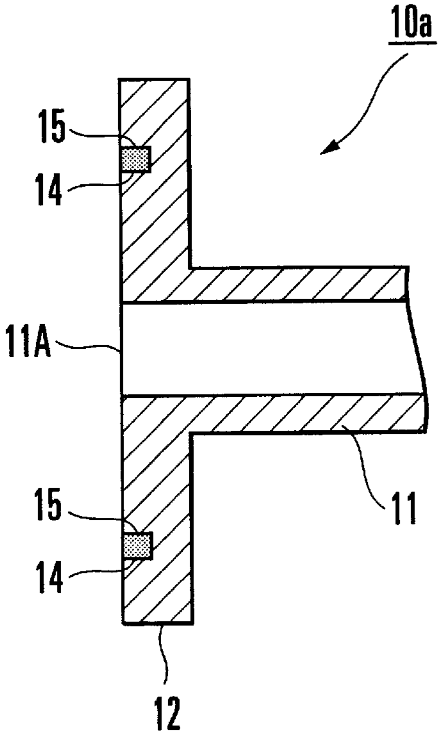
FIG. 5B is a sectional view taken along the line VB–VB' of FIG. 5A.

FIGS. 5A and 5B show a waveguide in which a packing is fitted in a flange. In FIG. 5A, a flange 32 of a shim 30 which is to be inserted in a waveguide 10*a* is indicated by a broken line. Since the shim 30 is a member for closing a gap formed at the waveguide connecting portion with portions around openings 11*a* and 21*a*, the diameter of the flange 32 of the shim 30 can be sufficiently smaller than that of a flange 12 of the waveguide 10*a.*

Therefore, a ring-like groove 14 with a diameter larger than that of the flange 32 of the shim 30 is formed in the surface of the flange 12 of the waveguide 10*a*, and a packing ring 15 is fitted in the groove 14. Since this can increase the air tightness of the waveguide connecting portion, a waveguide connecting structure that can withstand, e.g., even outdoor use, can be realized. In FIGS. 5A and 5B, the packing ring 15 is provided to the first waveguide 10*a*. Alternatively, the packing ring 15 may be provided to a second waveguide 20.

Figure 6A:
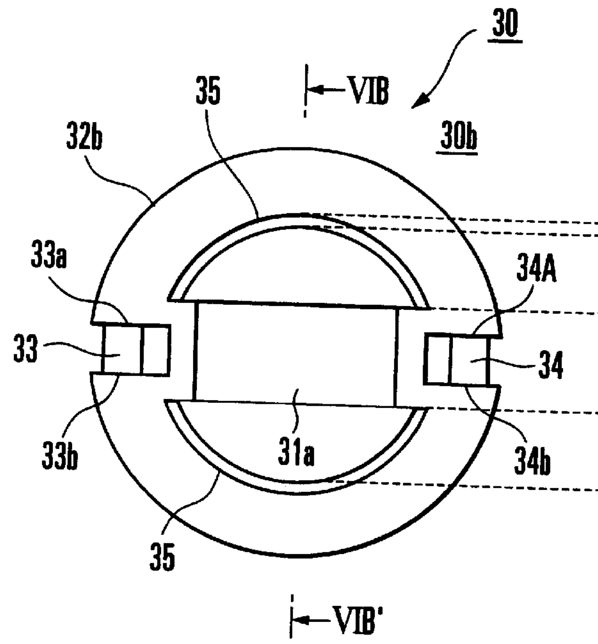
FIG. 6A is a front view of a shim the flange of which is a choke flange.
Figure 6B:
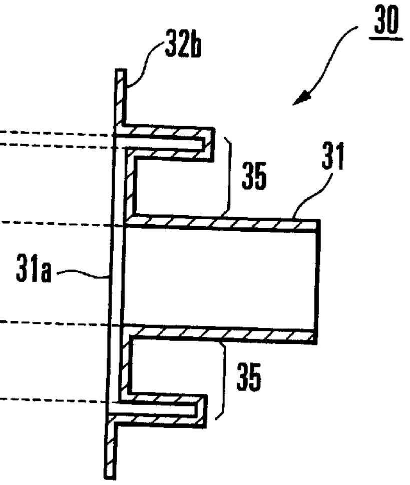
FIG. 6B is a sectional view taken along the line VIB–VIB' of FIG. 6A.

The flange 32 of the shim 30 may be a choke flange. FIGS. 6A and 6B show a case wherein a flange 32*b* of a shim 30 is a choke flange. As shown in FIG. 6A, choke grooves 35 are divisionally formed in an arcuate manner excluding regions of pawl-like portions 33 and 34 of the flange 32*b*. In other words, two ends of each choke groove 35 terminate on an extension of the corresponding long side of an opening 31*a*.

Similarly, the flange of a waveguide where a shim 30*b* is to be inserted is comprised of a choke flange with a choke groove (not shown) corresponding to a choke groove 35 of the shim 30*b*. This can further decrease the reflection loss caused at the waveguide connecting portion, and accordingly better reflection characteristics can be realized.

Figure 7:
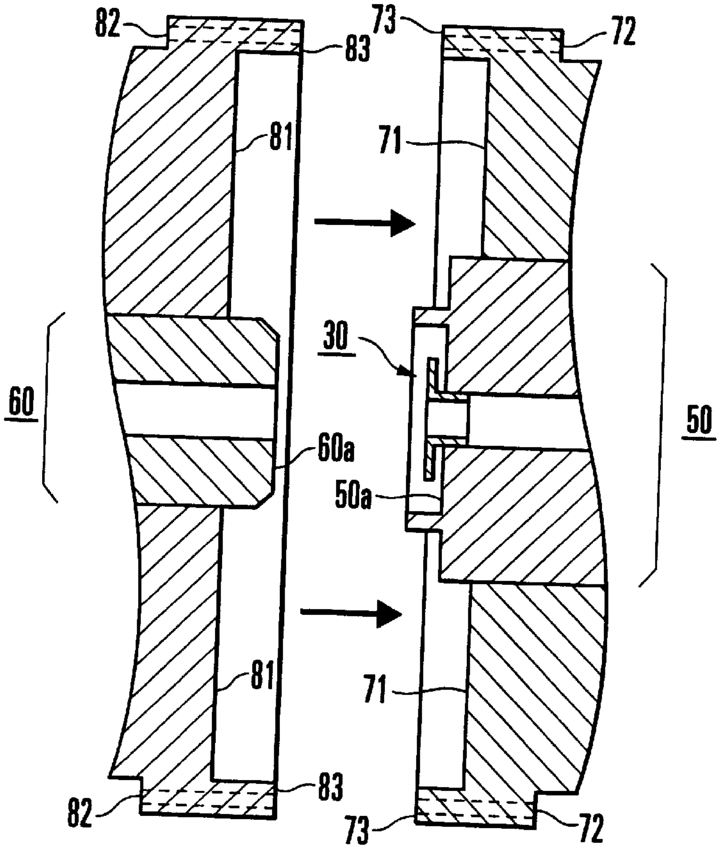
FIG. 7 is a sectional view of a connecting. portion in a case wherein waveguides are not directly coupled to each other with screws.

The present invention is also effective to connection of waveguides that are not directly coupled to each other with bolts or the like. FIG. 7 shows a case in which the present invention is applied to connection of such waveguides. FIG. 7 shows a state before the waveguides are connected to each other.

Waveguides 50 and 60 respectively constitute interfaces with an apparatus such as a transmitter/receiver and the primary emitter of an antenna. The waveguides 50 and 60 are connected to each other by coupling a housing 71 of the apparatus and a pan head 81 that supports the antenna. The housing 71 and pan head 81 are fixed to each other by bolts inserted in coupling holes 72 and 82 respectively formed in the peripheries of the housing 71 and pan head 81.

If end faces 73 and 83 of the housing 71 and pan head 81 which come into contact with each other are respectively on the same planes as end faces 50*a* and 60*a* of the waveguides 50 and 60, the waveguides 50 and 60 can be coupled to each other without a gap. In fact, however, due to tolerances in size and assembly of the waveguides 50 and 60, a gap is formed between the end faces 50*a* and 60*a* of the waveguides 50 and 60. In addition, the length of this gap is not necessarily constant.

In this case, a shim 30 is interposed between the waveguides 50 and 60 in order to separate the gap between the end faces 50*a* and 60*a* away from the interiors of the waveguides, so that the reflection loss at the waveguide connecting portion can be decreased.

In the above embodiment, the pawl-like portions are formed by bending back the periphery of the flange of the shim. Alternatively, pawl-like portions may be attached to the flange by using separate members.

As has been described above, according to the present invention, when connecting the waveguides to each other, the cylindrical portion of the shim comes into tight contact with the inner wall of the first waveguide, and the flange of the shim comes into tight contact with the end face of the second waveguide. Even if a gap is present between the end faces of the first and second waveguides, at the connecting portion, the cylindrical portion of the shim partly forms the waveguides, so that the discontinuity at the waveguide connecting portion can be improved. As a result, the reflection loss can be decreased, and good reflection characteristics can be obtained.

Since the shim has the pawl-like portions with spring properties, its flange is urged against the end face of the second waveguide. This increases the tight contact between the flange of the shim and the end face of the second waveguide, so that better reflection characteristics can be obtained.

If a ring-like groove is formed around the end face of the first or second waveguide and a packing is fitted in this groove, the air tightness of the waveguide connecting portion can be further improved while improving the reflection characteristics.

If the flange of the shim is a choke flange, better reflection characteristics can be obtained.

What is claimed is:

1. A waveguide connecting method comprising:

fabricating a shim with a cylindrical portion and a flexible flange which projects from one end of said cylindrical portion outwardly, said cylindrical portion having an outer diameter substantially equal to an inner diameter of a first waveguide which is to be connected to a second waveguide;

inserting the other end of said cylindrical portion of said shim into said first waveguide; and urging said second waveguide against said first waveguide, with a flanged end face of, said second waveguide being in contact with said flexible flange of said shim, until said flanged end face of said second waveguide abuts against a flanged end face of said first waveguide.

2. The waveguide connecting method according to claim 1, wherein said cylindrical portion comes into tight contact with an inner wall of said first waveguide and said flexible flange comes into tight contact with said flanged end face of said second waveguide.

3. The waveguide connecting method according to claim 1, wherein said cylindrical portion forms part of the waveguide when said first waveguide partly abuts against said second waveguide.

4. A waveguide connecting method comprising:

fabricating a shim with a cylindrical portion and a flange which projects from one end of said cylindrical portion outwardly, said cylindrical portion having an outer diameter substantially equal to an inner diameter of a first waveguide which is to be connected to a second waveguide;

inserting the other end of said cylindrical portion of said shim into said first waveguide; and urging said second waveguide against said first waveguide, with an end face of said second waveguide being in contact with said flange of said shim, until said end face of said second waveguide abuts against an end face of said first waveguide, wherein said fabricating comprises forming a pawl-like portion with spring properties on said flange, said inserting comprising urging said second waveguide against the spring properties of said pawl-like portion, thereby coupling said first and second waveguides to each other, so that said cylindrical portion of said shim comes into tight contact with an inner wall of said first waveguide and said flange of said shim comes into tight contact with said end face of said second waveguide.

5. A method according to claim 4, wherein the step of forming said pawl-like portion comprises the step of bending back part of a periphery of said flange toward the other end of said cylindrical portion, thereby forming said pawl-like portion.

6. A waveguide connecting method comprising:

fabricating a shim with a cylindrical portion and a flange which projects from one end of said cylindrical portion outwardly, said cylindrical portion having an outer diameter substantially equal to an inner diameter of a first waveguide which is to be connected to a second waveguide;

inserting the other end of said cylindrical portion of said shim into said first waveguide;

urging said second waveguide against said first waveguide, with an end face of said second waveguide being in contact with said flange of said shim, until said flanged end face of said second waveguide abuts against a flanged end face of said first waveguide;

forming a ring-like groove with a diameter larger than that of said flange of said shim in an end face of one of said first and second waveguides; and inserting a packing in said groove.

7. A waveguide connecting method comprising:

fabricating a shim with a cylindrical portion and a flange which projects from one end of said cylindrical portion outwardly, said cylindrical portion having an outer diameter substantially equal to an inner diameter of a first waveguide which is to be connected to a second waveguide;

inserting the other end of said cylindrical portion of said shim into said first waveguide; and urging said second waveguide against said first waveguide, with an end face of said second waveguide being in contact with said flange of said shim, until said end face of said second waveguide abuts against an end face of said first waveguide;

wherein said fabricating comprises forming, as said flange of said shim, a choke flange with a ring-like choke groove.

8. A waveguide connecting structure comprising:

a first waveguide;

a second waveguide to be connected to said first waveguide; and a shim with a cylindrical portion and a flexible flange which projects from one end of said cylindrical portion outwardly, said cylindrical portion having an outer diameter substantially equal to an inner diameter of said first waveguide and being insertable in said first waveguide, said flexible flange being interposed between flanged end faces of said first and second waveguides, when said first and second waveguides are to be connected to each other, to come into tight contact with at least said flanged end face of said second waveguide.

9. A waveguide connecting structure comprising:

a first waveguide;

a second waveguide to be connected to said first waveguide; and a shim with a cylindrical portion and a flange which projects from one end of said cylindrical portion outwardly, said cylindrical portion having an outer diameter substantially equal to an inner diameter of said first waveguide and being insertable in said first waveguide, said flange being interposed between flanged end faces of said first and second waveguides, when said first and second waveguides are to be connected to each other, to come into tight contact with at least said end face of said second waveguide, wherein said shim comprises a plurality of pawl-like portions formed on said flange to have spring properties, and said pawl-like portions being urged by said end face of said first waveguide against said end face of said second waveguide when said first and second waveguides are to be connected to each other.

10. A structure according to claim 9, a wherein said pawl-like portions are formed by bending back part of a periphery of said flange toward the other end of said cylindrical portion.

11. A structure according to claim 9, wherein said pawl-like portions are formed at a predetermined interval in a periphery of said flange.

12. A waveguide connecting structure comprising:

a first waveguide;

a second waveguide to be connected to said first waveguide; and a shim with a cylindrical portion and a flange which projects from one end of said cylindrical portion outwardly, said cylindrical portion having an outer diameter substantially equal to an inner diameter of said first waveguide and being insertable in said first waveguide, said flange being interposed between flanged end faces of said first and second waveguides, when said first and second waveguides are to be connected to each other, to come into tight contact with at least said flanged end face of said second waveguide, wherein one of said first and second waveguides comprises:

a ring-like groove formed in said end face thereof to have a diameter larger than that of said flange of said shim, and a packing fitted in said groove.

13. A waveguide connecting structure comprising:

a first waveguide;

a second waveguide to be connected to said first waveguide; and a shim with a cylindrical portion and a flange which projects from one end of said cylindrical portion outwardly, said cylindrical portion having an outer diameter substantially equal to an inner diameter of said first waveguide and being insertable in said first waveguide, said flange being interposed between end faces of said first and second waveguides, when said first and second waveguides are to be connected to each other, to come into tight contact with at least said end face of said second waveguide;

wherein said flange of said shim comprises a choke flange with a ring-like choke groove.

14. A structure according to claim 8, wherein said first and second waveguides comprise:

waveguide portions where said cylindrical portion of said shim is to be inserted, and waveguide flanges formed on connecting end faces of said waveguide portions, and when said first and second waveguides are to be connected to each other, said flange of said shim is interposed between said waveguide flanges of said first and second waveguides.

* * * * *